3,384,627
NOVEL POLYFLUOROALKYL ACRYLATE MONOMERS, POLYMERS AND INTERMEDIATES
Louis Gene Anello, Basking Ridge, and Richard F. Sweeney, Dover, Randolph Township, N.J., assignors to Allied Chemical Corporation, New York, N.Y., a corporation of New York
No Drawing. Filed Aug. 2, 1965, Ser. No. 476,749
20 Claims. (Cl. 260—89.5)

This invention relates to novel polyfluoroalkyl acrylate monomers, polymers thereof and to certain novel intermediate polyfluoro alcohols.

Polymers prepared from the monoesters of acrylic acid and its derivatives have been long recognized as thermoplastic materials whose utility is both wide and varied. For example, acrylic polymers have been successfully employed as aircraft components, internally illuminated commercial signs, vending machine parts, windows, dials, safety shields, motor-boat deck hatches, shoe heels, piano and organ keys, industrial housings, etc. In addition, acrylic polymers, particularly fluorine-containing acrylic polymers, are susceptible to vulcanization to yield tough, stable polymers suitable for use as gasket material and also as tenacious coating materials. Fluorine-containing acrylic polymers are also known to be useful to impart oleophobic and hydrophobic finishes to various materials, such as cotton cloth or wool fabric.

Polyfluoroalkyl acrylates of the formula:

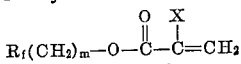

have been disclosed wherein $R_f$ is a perfluorinated alkyl group, X is H or $CH_3$ and wherein m is 1 (U.S.P. 2,642,416), wherein m is 2 (British Patent 971,732) and wherein m is 3–12 (U.S.P. 3,102,103). The number of carbon atoms in the perfluoroalkyl group varies in these patents from 3–14. Polyfluoroalkyl acrylate polymers derived from such compounds are disclosed as being useful to impart oleophobic and hydrophobic properties to a variety of porous materials. These prior art perfluoroalkyl acrylate monomers and polymers embrace a large number of species all of which are characterized by possessing a straight chain, aliphatic, alkylene group between the perfluoroalkyl moiety and the non-carbonylic oxygen atom.

We have found a small class of perfluoroalkyl acrylate polymers which possess particularly good oleophobic and hydrophobic properties and, equally if not more importantly, which possess particularly good stability and durability to wear, washings and dry cleaning, when applied to porous materials, such as textiles and the like. The novel and specific class of polymers so endowed contain recurring polyfluoroalkyl acrylate ester units of the formula:

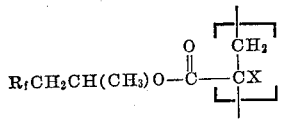

wherein $R_f$ is a perfluorinated alkyl group containing from 5–14 carbon atoms and X is a member selected from the group consisting of H and $CH_3$. These polymers may readily be prepared by polymerizing our novel polyfluoro acrylate monomers of the formula:

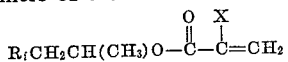

wherein $R_f$ and X are as defined above. It will be seen that the compounds of the invention have three essential characteristics: (a) the presence of a branched chain grouping between the perfluoroalkyl moiety and the non-carbonylic oxygen atom, (b) limitation of the carbon content of the branched chain moiety to a specific number of carbon atoms, viz., three and (c) limitation of the carbon content of the perfluoroalkyl group to 5–14. Polymeric compounds like those of the invention excepting that the perfluoroalkyl group and the branched chain grouping have carbon contents outside of the indicated ranges, do not possess the combination of exhibiting very high oleophobicity and of exhibiting particularly good stability and durability to wear, washings and dry cleaning, when applied to porous materials.

It is believed that one reason for the particularly high stability and increased durability of coatings of our specific and rather small class of polymers according to the invention, as compared to their straight chain counterparts, may be due to the fact that they are more hydrolytically stable. This is partially due to the presence of the electron releasing methyl group in the chain and partially due to steric hindrance towards hydrolysis caused by the branched chain. It is to be understood, of course, that the invention is not to be limited by the accuracy of any scientific explanation postulated herein.

The polymers of the invention containing the recurring polyfluoroalkyl acrylate ester units as above described may be homopolymers, in which the indicated recurring units are the only ones present; copolymers, in which these recurring units are interspersed with units derived from another polymerizable unsaturated monomer; or heteropolymers, such as terpolymers, in which there are more than two distinct types of recurring units interspersed in the molecule. The homoploymeric products are thermoplastic and, depending on the molecular weight, vary from soft rubbery compositions to sticky, adhesive-like materials. These polymers are stable, flame resistant, not appreciably soluble in hydrocarbon solvents, such as benzene or xylene, but are soluble in certain fluorocarbons, such as trifluoroethyl trifluoroacetate. The homopolymeric products, when used as fiber impregnators, impart good oleophobic and hydrophobic properties to such materials. The homopolymers also can be used to cast flexible, transparent, thermoplastic films, which can be used for wrapping and protective purposes. Co- and heteropolymeric products will reflect properties contributed by the co- or heteromonomer(s), but may be hard thermoplastic or thermo-setting resins, useful as structural components for a variety of purposes for which prior art acrylic polymers have been employed, a number of which have been mentioned heretofore. Suitable polymerizable monomers for preparation of the co- and heteropolymers include the ethylenically unsaturated monomers well known to the art, such as the vinyl compounds, e.g., vinyl esters, vinyl halides, vinyl alkyl ketones, vinyl alkyl sulfones, some specific examples being vinyl isopropyl sulfone, vinylidene dichloride and N-vinyl urea; olefinc compounds, such as ethylene, propylene, isobutylene, butadiene and isoprene; aromatic compounds containing olefinic unsaturated groups, such as styrene and alpha-methyl styrene; other acrylic compounds including dissimilar fluorinated acrylic monomers in accordance with the description of this invention, other halogenated acrylates, acrylic acid amides, acrylic acid nitriles, etc., some specific examples being methyl acrylate, butyl methacrylate, 2-ethylhexyl acrylate, N,N-diethylaminoethyl methacrylate and glycidyl acrylate; other unsaturated acid esters, such as methyl crotonate, methyl maleate, diethyl fumarate, allyl acetate, allyl caprylate and a variety of other unsaturated compounds, such as unsaturated ketones, e.g., alkyl vinyl ketones and the like. Co- and heteropolymers which may be produced from a mixture of two or more of the novel polyfluoroalkyl acrylate monomers of the invention, as hereinafter to be described, are particularly easy to prepare and make excellent hydrophobic and oleophobic coating agents.

Modifiers, such as mercaptans, may be used to decrease the molecular weight of the polymeric products.

In the following and foregoing discussion of the invention it is intended that the term "acrylic" or the term "acrylate" be understood to comprehend "methacrylic" or "methacrylate."

The novel polymers of the invention may be prepared by conventional polymerization techniques, such as bulk polymerization, emulsion polymerization and solution polymerization of the aprpopriate monomers, as defined above, including the novel monomers of the invention as defined by the following formula:

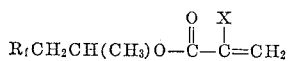

$$R_f CH_2 CH(CH_3) O - \overset{O}{\underset{\|}{C}} - \overset{X}{\underset{|}{C}} = CH_2$$

wherein $R_f$ is a perfluoroalkyl group, straight chain or branched, containing from 5–14 carbon atoms and X is H or $CH_3$. A preferred range of carbon atoms for the $R_f$ group is 8–10 and the preferred group of compounds defined by this range include those comprising a mixture of compounds containing carbon chain lengths within this range. Another preferred species consists of those compounds, as above defined, wherein X is H. Illustrative perfluoroalkyl acrylate monomers within the scope of the invention include the following:

1,2,2-trihydro-2-methylundecafluoroheptyl acrylate
1,2,2-trihydro-2-methylpentadecafluorononyl acrylate
1,2,2-trihydro-2-methylheptadecafluorodecyl acrylate
1,2,2-trihydro-2-methylheneicosafluorododecyl acrylate
1,2,2-trihydro-2-methylpentadecafluorononyl methacrylate
1,2,2-trihydro-2-methlheptadecafluorodecyl methacrylate
1,2,2-trihydro-2-methylheneicosafluorododecyl methacrylate
1,2-2-trihydro-2-methylnonacosafluorohexadecyl methacrylate Methods for preparing the monomers and polymers of the invention and the various intermediates and starting materials therefor, including preferred modes of operation, will now be discussed in more detail under the indicated headings.

THE POLYMERIZATION REACTION

The polymerization reaction may be carried out by any conventional method as indicated heretofore. Bulk polymerization may be carried out using some form of light or a peroxide as initiator. Solution polymerization can be carried out employing a suitable solvent, such as trifluoroethyl trifluoroacetate, and a catalyst, such as a peroxide as initiator.

The preferred method of polymerization is in aqueous emulsion. The polymer can be obtained as an emulsion but is normally obtained as a coagulated polymer or as a mixture of coagulated polymer and emulsion. Emulsification can be effected by the addition of any one of a number of conventional anionic, non-ionic or cationic emulsifiers such as sodium lauryl sulfate, the KF salt of perfluorosulfonic acid, trimethyltetradecylammonium chloride, sodium lauryl sulfosuccinate and the like. The emulsions may be easily used to apply thin films of the polymers to various surfaces by conventional methods including the procedure, for example, of coating, as by brushing, dipping or spraying and subsequent air-drying. If the polymer is not recovered in substantially emulsion form it should be further coagulated prior to use in forming films. This may be accomplished by addition of a coagulating agent, such as methanol or acetone, or by mechanical methods, such as freezing. The coagulum, after drying, must be dissolved or dispersed in a suitable solvent prior to use.

Suitable polymerization catalysts or initiators are illustrated by organic or inorganic free radical generators, such as benzoyl peroxide, lauryl peroxide, acetyl peroxide, succinyl peroxide, azobutyronitrile, potassium persulfate, hydrogen peroxide and sodium peroxide.

Polymerization may also be initiated by means of actinic radiation (light) and such is normally accomplished by placing the monomers in an evacuated sealed tube and then exposing the tube to a light source, preferably ultraviolet light, at temperatures ranging from about room temperature to about 125° C.

The reaction time for the polymerization varies over a wide range and is dependent both upon the temperature employed and upon the nature of the free-radical initiator, or the intensity of the actinic radiation, whichever may be the case. Normally polymerization catalyzed by actinic radiation is accomplished in about 10–72 hours. When organic catalysts are employed, polymerization may be accomplished within a period of about 1–10 hours.

Polymerization can be recognized by observing the formation of a rubbery or hard, tacky material or by observing coagulation or formation of an emulsion out of solution.

Example 1

To a three-necked 50 ml. flask, equipped with a gas inlet tube, stirrer, thermometer and a reflux condenser were added 15 g. of deionized water, 0.09 g. of sodium lauryl sulfate, 0.05 g. of potassium persulfate and 2.5 g. of 1,2,2-trihydro-2-methylpentadecafluorononyl acrylate. After flushing the flask contents with nitrogen, the temperature of the reaction vessel contents was raised to 50–55° C. and was maintained within that range for a period of about three hours. During this period polymerization took place, as evidence by the formation of a tacky mass in the reaction vessel. The polymeric mass was washed with water and methanol and was then dried under vacuum to give approximately 2.5 g. of a clear rubbery polymer. The polymer was found to be insoluble in benzene and xylene and soluble in trifluoroethyl trifluoroacetate.

Examples 2–9

The procedure described in Example 1 is repeated excepting that acrylate monomers, initiators and emulsifiers are varied as indicated in the following table. In all cases substantially the same results are obtained; that is to say, good yields of a clear, rubbery polymer are obtained.

TABLE I

| Ex. | Acrylate Monomer(s) | Initiator | Emulsifier |
|---|---|---|---|
| 2 | 1,2,2-trihydro-2-methylundecafluoroheptyl acrylate | Potassium persulfate | Sodium lauryl sulfate. |
| 3 | 1,2,2-trihydro-2-methylheptadecafluorodecyl acrylate | do | Do. |
| 4 | 1,2,2-trihydro-2-methylheneicosafluorododecyl acrylate | Benzoyl peroxide | Do. |
| 5 | 1,2,2-trihydro-2-methylheptadecafluorodecyl methacrylate | Azobutyronitrile | Trimethyltetradecylammonium chloride. |
| 6 | 1,2,2-trihydro-2-methylheneicosafluorododecyl methacrylate | Sodium peroxide | Sodium lauryl sulfosuccinate. |
| 7 | 1,2,2-trihydro-2-methylnonacosafluorohexadecyl methacrylate | Benzoyl peroxide | Do. |
| 8 | A mixture of 50% by weight 1,2,2-trihydro-2-methylheptadecafluorodecyl acrylate and 1,2,2-trihydro-2-methylheneicosafluorododecyl acrylate. | do | KF salt of perfluorosulfonic acid. |
| 9 | A mixture of 30% by weight 1,2,2-trihydro-2-methylpentadecafluorononyl acrylate, 40% by weight 1,2,2-trihydro-2-methylheptadecafluorodecyl acrylate and 30% by weight 1,2,2-trihydro-2-methylheptadecafluorodecyl methacrylate. | Potassium persulfate | Sodium lauryl sulfate. |

PREPARATION OF THE NOVEL POLYFLUOROALKYL ACRYLATE MONOMERS

The novel polyfluoroalkyl acrylate monomers, or mixtures thereof, are prepared by reacting the corresponding 1-(perfluoroalkyl)-2-propanol of the formula:

$$R_fCH_2CHOHCH_3$$

wherein $R_f$ is a perfluorinated alkyl group, straight chain or branched, containing 5–14 carbon atoms, with an acrylic compound of the formula:

wherein X is H or $CH_3$ and Y is Cl, OH or $OCH_3$. The acrylic reactant may also be employed in the form of its anhydride which may be used in situ by reacting a mixture of glacial acrylic acid and perfluoroacetic anhydride with the alcohol reactant at below about room temperature.

The molar ratio of the reactants is not critical and from about 0.1 mole to about 10 moles alcohol reactant per mole acrylic reactant may be employed to secure the desired reaction product. In order to secure highest yields, however, a substantially stoichiometric molar ratio should be employed, i.e., a mole ratio of about 1:1.

The reaction proceeds quite smoothly in the absence of a solvent. A suitable solvent, if desired however, may be employed to serve as a diluent and to facilitate the reaction at elevated temperatures. Generally speaking, any solvent may be employed provided it is inert under the conditions of the reaction and provided, of course, that it is a solvent for the reactants. Illustrative suitable solvents include: benzene, pyridine, quinoline, nitrobenzene, dimethyl aniline, trifluoroacetic acid, Decalin and 1,1,2-trifluoro-1,2,2-trichloroethane.

In order to minimize reaction time, any of the well known esterification catalysts, such as pyridine, quinoline, trifluoroacetic acid, p-toluene sulfonic acid, phosphonic acid, sulfuric acid and cupric chloride may be employed. The amount of catalyst is not critical and may range from about 1.0 to 200% by weight based on the amount of alcohol reactant charged. When acrylyl or methacrylyl chloride is used, pyridine and quinoline are preferred catalysts since each, in sufficient amounts, acts as a solvent as well. Additionally, due to their low boiling points, pyridine and quinoline may be readily separated from the reaction product by simple distillation. If employed, the amount of pyridine or quinoline charged to the reaction mixture is generally about 0.10 to 2.00 parts, preferably 0.5 to 1.5 parts, per part alcohol reactant charged.

The reaction temperature may vary over a wide range, i.e., from below room temperature up to the boiling point of the reaction mixture. Normally a temperature selected from about room temperature to 100° C. is utilized with a mild agitation of the reaction mixture. When the anhydride form of acrylic acid is employed, the reaction mixture is preferably maintained at about room temperature, say between about 10–30° C. and still preferably below about room temperature.

The esterification reaction is preferably run in the presence of a small amount of a conventional polymerization inhibitor, such as hydroquinone, α-pinene and p-tertiarybutyl catechol, in order to avoid undesirable premature polymerization which may take place to some extent, particularly at the more elevated temperatures.

Reaction times will depend upon the reactivity of the acrylic reactant chosen, the catalyst used, if any, and other variables, such as temperature. Substantial yields of product may be formed in a period from about 30 minutes to several hours.

Recovery and purification of the resulting ester products may be effected by employing conventional procedures, such as solvent extraction, a series of water washing steps followed by drying, or ordinary distillation.

Example 10

To a three-necked 50 ml. flask immersed in an ice bath and fitted with a stirrer, reflux condenser, thermometer and dropping funnel, were added 4.0 g. (0.056 mole) of glacial acrylic acid and 0.1 g. of hydroquinone. Through the dropping funnel were added 12.0 g. (0.058 mole) of perfluoroacetic anhyride to the reaction flask contents, with stirring, at a rate so that the temperature of the stirred solution did not exceed 15° C. After completion of the addition of the anhydride reagent, 25 g. (0.058 mole) of 1-(pentadecafluoroheptyl)-2-propanol were slowly added at a temperature of 15–16° C. The mixture was allowed to warm to 76° C. and then allowed to stand overnight. At the end of this period the mixture was distilled and there were recovered 13 g. (0.027 mole, 46.5% yield) of 1,1,2-trihydro-2-methylpentadecafluorononyl acrylate.

*Analysis.*—Calculated for $C_{13}H_9F_{15}O_2$, percent: C, 32.36; H, 1.86; F, 59.13. Found, percent: C, 31.7; H, 1.68; F, 58.5.

Infrared spectrographic analysis of this compound showed peaks consistent with the expected structure.

Examples 11–16

The procedure of Example 10 is repeated in identical apparatus excepting that alcohol reactants, acrylic reactants and acrylate end products are varied as indicated in the following table:

TABLE II

| Ex. | Alcohol reactant | Acrylic reactant | Acrylate end product |
| --- | --- | --- | --- |
| 11 | 1-(undecafluoropentyl)-2-propanol | Acrylic acid | 1,2,2-trihydro-2-methylundecafluoroheptyl acrylate. |
| 12 | 1-(pentadecafluoroheptyl)-2-propanol | Methacrylic acid | 1,2,2-trihydro-2-methylpentadecafluorononyl methacrylate. |
| 13 | 1-(heptadecafluorooctyl)-2-propanol | Acrylyl chloride | 1,2,2-trihydro-2-methylheptadecafluorodecyl acrylate. |
| 14 | 1-(nonadecafluorononyl)-2-propanol | Acrylic acid | 1,2,2-trihydro-2-methylnonadecafluoroundecyl acrylate. |
| 15 | 1-(heneicosafluorodecyl)-2-propanol | Methacrylyl chloride | 1,2,2-trihydro-2-methylheneicosafluorododecyl methacrylate. |
| 16 | 1-(nonacosafluorotetradecyl)-2-propanol | do | 1,2,2-trihydro-2-methylnonacosafluorohexadecyl methacrylate. |

PREPARATION OF THE 1-(PERFLUOROALKYL)-2-PROPANOL INTERMEDIATES

The 1-(perfluoroalkyl)-2-propanol intermediates may be prepared by a conventional procedure, i.e., reduction of the corresponding 1,2-epoxy-1,1,2,3,3-pentahydroperfluoroalkanes of the formula:

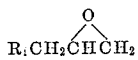

wherein $R_f$ is a perfluorinated alkyl group, straight chain or branched, containing 5–14 carbon atoms, with a metal hydride, such as $NaBH_4$ or $LiAlH_4$ in the presence of a solvent.

The solvent may be any one of a number typically used in metal hydride reductions. The metal hydride and epoxide reactants should have a reasonable solubility in the solvent and the solvent should, of course, be inert towards reactants and reaction products. Dioxane and diethyl ether are illustrative of suitable solvents.

The reduction reaction should be carried out under essentially anhydrous conditions in order to minimize hydrolysis of the epoxide reactant.

For most efficient results, the molar ratio of epoxide reactant to metal hydride reductant should be between about 4:1–1:2.

Reaction temperatures should be somewhat elevated in order to promote favorable reaction rates. The maximum reaction temperature is limited by the reflux temperature of the solvent. In the case of dioxane, for example, this is about 100° C.; in the case of diethyl ether, it is about 35° C.

Product recovery can be effected by decomposing the unreacted metal salts under acidic conditions, such as with a dilute solution of HCl. Subsequent to such decomposition, the product mixture may be extracted with ether, dried and distilled to recover the sought-for alcohol product.

Example 17

To a three-necked 100 ml. flask, fitted with a stirrer, reflux condenser and thermometer, were added 3 g. (0.08 mole) of sodium borohydride and 30 g. of dioxane. To this mixture were added 16 g. (0.038 mole) of 1,2-epoxy-1,1,2,3,3-pentahydropentadecafluorodecane and the reaction flask contents were heated at 100° C. for 64 hours. At the end of this period the unreacted sodium salts were decomposed by the addition of 60 ml. of 10% HCl, following which the product mixture was extracted with ether, dried and distilled. From the distillation there were obtained 4.5 g. (0.010 mole) of unreacted epoxide and 6.5 g. (0.015 mole, 53% yield) of 1-(pentadecafluoroheptyl)-2-propanol, B.P. 87° C./13 mm.

*Analysis.*—Calculated for $C_{10}H_7F_{15}O$, percent: C, 28.03; H, 1.64; F, 66.58. Found, percent: C, 27.8; H, 1.7; F, 67.0.

Infrared spectrum analysis was consistent with the expected structure.

Examples 18–22

The procedure described in Example 17 is repeated excepting that epoxide reactants, metal hydride reductants, solvents and end products are varied as indicated in the following table:

Progress of the reaction may be followed by removing aliquots of the aqueous layer and determining the concentration of iodide present.

Example 23

To a three-necked 100 ml. flask, fitted with a stirrer, reflux condenser and thermometer, was added a mixture of 46 g. (0.083 mole) of 2-iodo-3-(pentadecafluoroheptyl)-1-propanol and 50 ml. of a 20% aqueous solution of KOH and the resulting mixture was stirred at 40° C. for a period of about 21 hours. At the end of this period the aqueous product mixture was extracted with diethyl ether. The ethereal extracts were dried over $MgSO_4$ and filtered. Distillation of the filtrate gave 19 g. (0.045 mole, 96% yield) of 1,2-epoxy-1,1,2,3,3-pentahydropentadecafluorodecane, B.P. 75–76° C./13 mm.

*Analysis.*—Calculated for $C_{10}H_5F_{15}O$, percent: C, 28.17; H, 1.17; F, 66.90. Found, percent: C, 28.6; H, 1.23; F, 67.5. Infrared spectrographic analysis was consistent with the expected structure.

PREPARATION OF THE IODOHYDRIN INTERMEDIATES

The iodohydrin intermediates are prepared by heating a mixture of allyl alcohol, a catalyst and a perfluoroalkyl iodide of the formula:

$$R_fI$$

wherein $R_f$ is a perfluorinated alkyl group, straight chain or branched, containing 5–14 carbon atoms. The reaction is illustrated by the following equation:

$$R_fI + CH_2=CHCH_2OH \xrightarrow{cat.} R_fCH_2CHICH_2OH$$

wherein $R_f$ is as defined above.

Allyl alcohol is commercially available and may be used without further purification.

The perfluoroalkyl iodide reactants are known materials and may be prepared by conventional means, such as by the pyrolysis of the silver salt of a perfluorocarboxylic acid in the presence of iodine, or by the telomerization of tetrafluoroethylene using a perfluoroalkyl iodide as the telogen. A perfluoroalkyl iodide of a discreet molecular weight may be used or a mixture of perfluoroalkyl

TABLE III

| Ex. | Epoxide reactant | Metal hydride reductant | Solvent | End product |
|---|---|---|---|---|
| 18 | 1,2-epoxy-1,1,2,3,3-pentahydroundecafluorooctane | $NaBH_4$ | Dioxane | 1-(undecafluoropentyl)-2-propanol. |
| 19 | 1,2-epoxy-1,1,2,3,3-pentahydroheptadecafluoroundecane | $NaBH_4$ | do | 1-(heptadecafluorooctyl)-2-propanol. |
| 20 | 1,2-epoxy-1,1,2,3,3-pentahydrononadecafluorododecane | $NaBH_4$ | Diethyl ether | 1-(nonadecafluorononyl)-2-propanol. |
| 21 | 1,2-epoxy-1,1,2,3,3-pentahydroheneicosafluorotridecane | $LiAlH_4$ | do | 1-(heneicosafluorodecyl)-2-propanol. |
| 22 | 1,2-epoxy-1,1,2,3,3-pentahydrononacosafluoroheptadecane | $LiAlH_4$ | do | 1-(nonacosafluorotetradecyl)-2-panol. |

PREPARATION OF THE PERFLUORO-1,2-EPOXY-ALKANE INTERMEDIATES

The 1,2-epoxy-1,1,2,3,3-pentahydroperfluoroalkane intermediates may be prepared by conventional dehydrohalogenation procedures, e.g., dehydroiodination of the corresponding iodohydrin (2-iodo-3-(perfluoroalkyl)-1-propanol) of the formula:

$$R_fCH_2CHICH_2OH$$

wherein $R_f$ is a perfluorinated alkyl radical, straight chain or branched, containing from 5–14 carbon atoms, with an aqueous solution of a basic material, such as an alkali metal or alkaline earth metal hydroxide.

A 10–20% aqueous solution of NaOH or KOH is particularly satisfactory.

Reaction temperatures are preferably maintained between about 30° C. and reflux temperature and still preferably between about 35–45° C.

iodides may be employed. As indicated heretofore, the perfluoroalkyl group may contain 5–14 carbon atoms, but in a preferred embodiment, contains 8–10 carbon atoms or constitutes a mixture of perfluoroalkyl groups containing 8–10 carbon atoms, and still preferably, constitutes a mixture of the $C_8$ and $C_{10}$ species.

The catalyst employed in the preparation of the iodohydrins may include any of the free radical initiator type catalysts, such as those disclosed and illustrated to be suitable for use in the polymerization reaction, discussed supra. The preferred catalysts are 2,2'-di-azoisobutyronitrile, di-t-butyl peroxide and dibenzoyl peroxide. The catalyst concentration may vary from 0.1–100 mole percent of the perfluoroalkyl iodide reactant present, but the preferred concentration is between 0.5–10 mole percent of the perfluoroalkyl iodide reactant.

The stoichiometry of the reaction requires one mole of perfluoroalkyl iodide per mole of allyl alcohol. The allyl alcohol reactant may be used in an amount in excess of the stoichiometric to ensure complete utilization of the perfluoroalkyl iodide. The preferred molar ratio of allyl alcohol to perfluoroalkyl iodide is 1:1 to 2.5:1. No advantage accrues from using a deficiency or a larger excess of the allyl alcohol reactant.

Reaction temperatures will generally depend upon the activity of the catalyst employed. When using di-t-butyl peroxide, for example, the preferred temperature range lies between 90–130° C. If 2,2′-di-azo-isobutyronitrile is employed, the preferred temperature range lies between 60–70° C. and if benzoyl peroxide is used, the preferred temperature range lies between 80–90° C. Optimum temperature ranges, when other catalysts are employed, may be determined by trial and error experimentation.

The reaction can be efficiently carried out at atmospheric pressure and although super- or subatmospheric pressures can be employed, no particular advantages accrue from operation at such pressures.

The iodohydrin product may be recovered by fractional distillation.

Example 24

To a three-necked 50 ml. flask, equipped with a stirrer, reflux condenser and thermometer, were charged 6.0 g. (0.10 mole) of allyl alcohol, 25.0 g. (0.050 mole) of 1-iodoperfluoroheptane and 0.5 g. (0.03 mole) of di-t-butyl peroxide. The reaction flask contents were heated to 80–90° C. and maintained at that temperature for a period of about 48 hours. At the end of this period the product mixture was subjected to fractional distillation from which there were recovered 15 g. (0.028 mole, 56% conversion) of $CF_3(CF_2)_6CH_2CHICH_2OH$, B.P. 85° C./1 mm.

*Analysis.* — Calculated for $C_{10}H_6F_{15}OI$, percent: C, 21.66; H, 1.08; F, 51.44; I, 22.9. Found, percent: C, 21.8; H, 1.30; F, 50.7; I, 23.1. Infrared spectrographic analysis confirmed the expected structure.

UTILITY OF THE POLYMERIC PRODUCTS

The homopolymeric products may be used to impart oil and water repellent properies to a variety of porous materials, such as textiles, fibers, fabrics of natural or synthetic origin, e.g., cotton cloth, nylon and a variety of other substrates, such as paper, wood, metal and the like. The polymer is applied as a coating to such materials by conventional techniques, such as spraying, brushing or dipping procedures. The polymers may be used as an aqueous emulsion or in solution with a suitable solvent, followed by drying of the coated material to remove water or the solvent.

In the following example, the so-called "3M Oil Repellency Test" was used to evaluate the oil repellent properties of a cotton fabric treated with representative homopolymeric products. This test was performed as described by E. J. Grajeck et al., Textile Research Journal, April 1962, pp. 323–324. Water repellency was evaluated by the "Spray Test Method" (ASTM–D583–58).

Example 25

Samples of 80″ x 80″ undyed cotton print cloth were dipped into a solution comprising 2% by weight of the 1,2,2 - trihydro - 2-methylpentadecafluorononyl acrylate polymer, prepared in Example 10, in a solvent comprising 1 - methoxy - 2-chlorohexafluorocyclopentene. The cloth samples were blotted with paper toweling to remove excess solution and were then dried in an oven at 160° C. for five minutes. The oil repellency, as measured by the "3M Oil Repellency Test," received a rating of 110. The water repellency, as measured by the "Spray Test Method," received a rating of 70.

When other homopolymers within the scope of the invention are used to form coatings on porous materials, such as described above, substantially the same results are obtained, i.e., there is imparted to such materials good oil and water repellency properties. Even more significantly, coatings so formed and applied exhibit a high degree of durability and retain their oleophobic and hydrophobic properties even after repeated washings, dry cleaning and long wear.

The homopolymeric products may also be used to cast elastic, transparent, thermoplastic films by conventional procedures, such as by casting a solution of the polymeric product in a suitable solvent over a smooth surface, evaporating the solvent therefrom, drying the resulting film and stripping the same from the smooth surface. Such films may also be prepared by casting solutions of the corresponding monomers over the smooth surface in a suitable solvent, evaporating the solvent, drying the resulting film and polymerizing in situ by means of heat and small amounts of a conventional initiator.

Co- and heteropolymers may be prepared by procedures well known to the art by polymerizing mixtures of monomers according to the invention and other polymerizable monomers with heat, in the presence of conventional catalysts to yield resins reflecting properties contributed by each of the monomers employed. Depending upon the choice of monomers, such resins may be either of a thermoplastic or thermosetting nature and may be used as structural components for a variety of purposes for which prior art acrylic polymers are known to be useful, some of which have been discussed heretofore.

The foregoing description is to be taken as illustrative only and the invention is to be limited only by the scope of the appended claims.

We claim:
1. Polyfluoroalkyl acrylates of the formula:

$$R_fCH_2CH(CH_3)O-\underset{\underset{O}{\|}}{C}-\underset{\underset{X}{|}}{C}=CH_2$$

wherein $R_f$ is a perfluoroalkyl group containing 5–14 carbon atoms and X is H or $CH_3$.

2. Polyfluoroalkyl acrylates according to claim 1 wherein $R_f$ contains 8–10 carbon atoms.

3. Polyfluoroalkyl acrylates according to claim 1 wherein $R_f$ is a mixture of perfluoroalkyl groups contining 8–10 carbon atoms.

4. 1,2,2-trihydro-2-methylundecafluoroheptyl acrylate.

5. 1,2,2 - trihydro-2-methylpentadecafluorononyl acrylate.

6. 1,2,2 - trihydro-2-methylheptadecafluorodecyl acrylate.

7. 1,2,2-trihydro-2-methylheneicosafluorododecyl acrylate.

8. 1,2,2,-trihydro-2-methylheptadecafluorodecyl methacrylate.

9. Polymers comprising recurring polyfluoroalkyl acrylate ester units of the formula:

$$R_fCH_2CH(CH_3)O-\underset{\underset{O}{\|}}{C}-\overset{\overset{CH_2}{\ulcorner\quad\urcorner}}{\underset{\llcorner\quad\lrcorner}{C X}}$$

wherein $R_f$ is a perofluoroalkyl group containing 5–14 carbon atoms and X is H or $CH_3$.

10. Polymers according to claim 9 wherein $R_f$ contains 8–10 carbon atoms.

11. Polymers according to claim 9 wherein $R_f$ is a mixture of perfluoroalkyl groups containing 8–10 carbon atoms.

12. Polymers comprising recurring polyfluoroalkyl acrylate ester units of the formula:

$$CF_3(CF_2)_6CH_2CH(CH_3)O-\underset{\underset{O}{\|}}{C}-\overset{\overset{CH_2}{\ulcorner\quad\urcorner}}{\underset{\llcorner\quad\lrcorner}{CH}}$$

13. Polymers comprising recurring polyfluoroalkyl acrylate ester units of the formula:

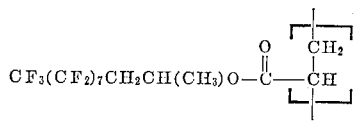

14. Polymers comprising recurring polyfluoroalkyl acrylate ester units of the formula:

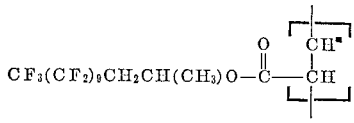

15. A polyfluoroalkyl acrylate homopolymer derived from a monomer having the formula:

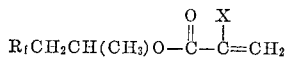

wherein $R_f$ is a perfluoroalkyl group containing 5–14 carbon atoms and X is H or $CH_3$.

16. A polyfluoroalkyl acrylate homopolymer according to claim 15 wherein $R_f$ contains 8–10 carbon atoms.

17. A polyfluoroalkyl acrylate homopolymer according to claim 15 wherein $R_f$ is a mixture of perfluoroalkyl groups containing 8–10 carbon atoms.

18. A textile fabric sized with a polymer comprising recurring polyfluoroalkyl acrylate ester units of the formula:

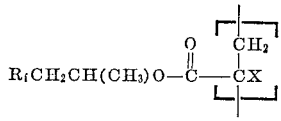

wherein $R_f$ is a perfluorinated alkyl group containing 5–14 carbon atoms and X is H or $CH_3$.

19. Fibers coated with a polymer comprising recurring polyfluoroalkyl acrylate ester units of the formula:

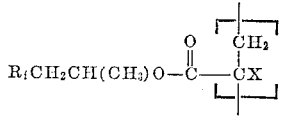

wherein $R_f$ is a perfluorinated alkyl group containing 5–14 carbon atoms and X is H or $CH_3$.

20. Porous materials coated with a polymer comprising recurring polyfluoroalkyl acrylate ester units of the formula:

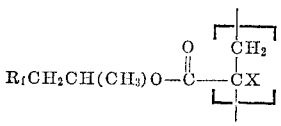

wherein $R_f$ is a perfluorinated alkyl group containing 5–14 carbon atoms and X is H or $CH_3$.

No references cited

JOSEPH L. SCHOFER, *Primary Examiner.*

H. WONG, Jr., *Assistant Examiner.*